United States Patent Office 3,034,241
Patented May 15, 1962

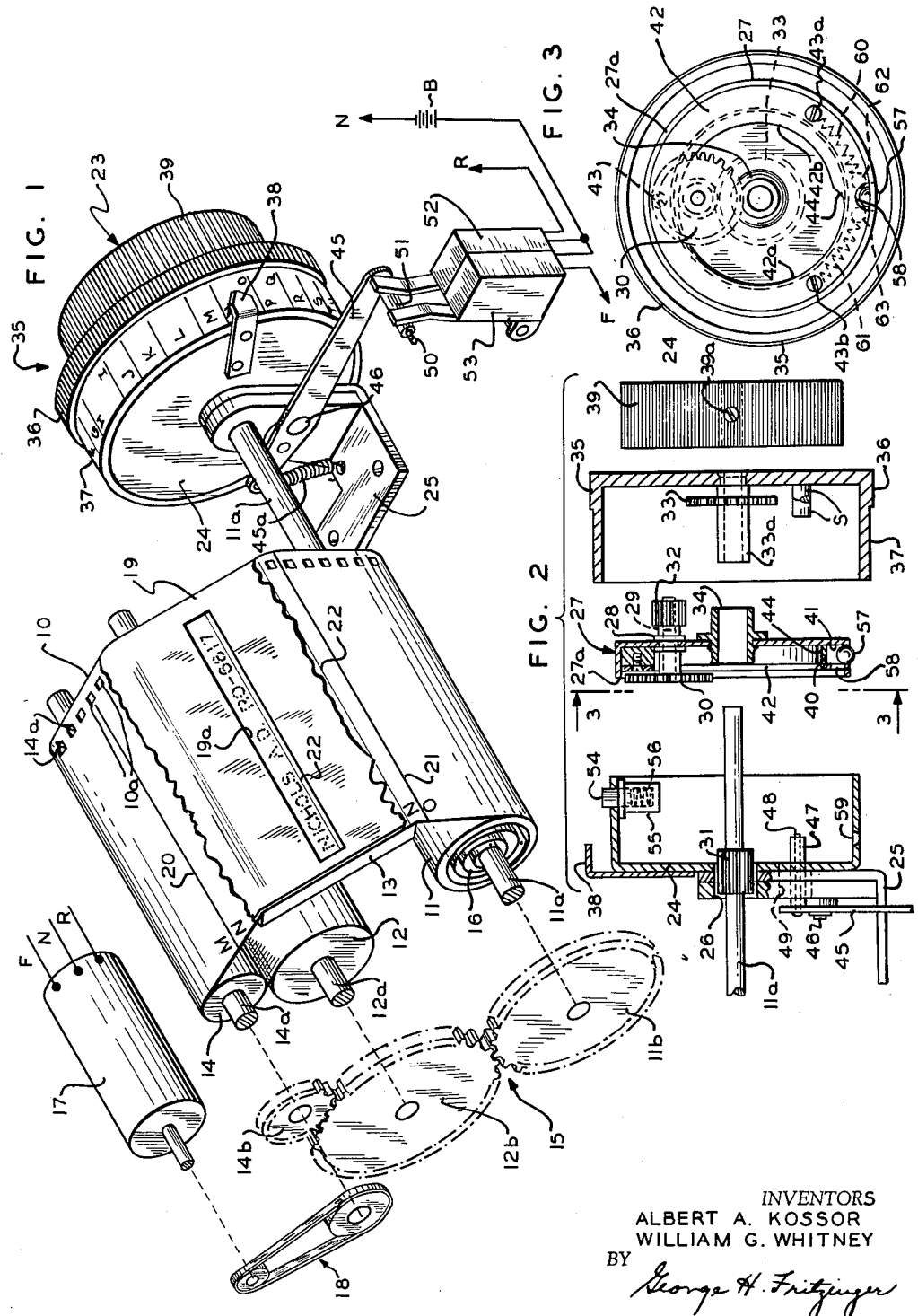

3,034,241
TELEPHONE SUBSCRIBERS LIST FINDER AND SELECTOR MECHANISM THEREFOR
Albert A. Kossor, Kenilworth, and William G. Whitney, Wayne, N.J., assignors to McGraw-Edison Company, Elgin, Ill., a corporation of Illinois
Filed May 24, 1960, Ser. No. 31,355
7 Claims. (Cl. 40—53)

The invention relates to a list finder which upon manually presetting an indexing control is power driven at a fast speed to move a portion of the list into view corresponding to the index setting and which by moving a second "vernier" control is directly manually operated at a relatively slow speed. In a more particular sense the invention relates to a novel form of position follow-up servomechanism which has an indexing control for fast motor-driven operation and a second control for direct manual operation.

The embodiment herein particularly described to illustrate the invention is especially useful in connection with automatic telephone dialling machines in which telephone subscribers numbers are recorded in code form and played back selectively merely by shifting a subscriber's list finder to the desired party to be called and pressing a start control, such automatic dialing machine being disclosed for example in the Kobler et al. application Serial No. 784,258, filed December 31, 1958, and entitled "Telephone Calling Equipment." It will be understood however that no unnecessary limitation of the invention to dialing machines nor to list finders is intended since the invention has application wherever selective positioning through a wide range of movement is first desired to within a general area at a fast speed to be followed by precise manual positioning within that area.

Objects of the invention are to provide an improved selecting mechanism for list finders or the like, which has both a manual control for direct operation and a manual indexing control for fast motor-driven operation, which is free of both sliding switch contacts and flexible lead connections, and which is mechanically simple and highly dependable in operation.

A feature of the invention resides in a selecting mechanism of the character described which employs a planetary gear the carrying member of which is shiftable out of a neutral position by a manual indexing control for activating a motor switch in a directional sense through a machanical linkage and causing the motor to drive a member with a fast follow-up action to a position corresponding to the index control setting, with the planetary gear carriage being returned automatically during the follow-up motion to its neutral position whereupon the motor drive is stopped. The driven member is also arranged to be directly manually operated. In order that the planetary gear carriage will not be shifted out of neutral during direct manual operation of the driven member, and the indexing control will not be shifted from its setting during motor-driven operation of the driven member, the indexing control is provided with a fixed frictional drag and the planetary gear carriage is provided with a novel detenting means which has a strong detenting action for holding the carriage in its neutral position but which leaves the carriage substantially friction-free when the carriage is out of neutral position.

These and other objects and features of the invention will be apparent from the following description and the appended claims.

In the description of the invention, reference is had to the accompanying drawings, of which:

FIGURE 1 is an exploded fractional perspective view of a telephone subscribers list finder incorporating a selecting mechanism according to the invention;

FIGURE 2 is an exploded view, partly in section, of the selector mechanism; and

FIGURE 3 is a view taken on the line 3—3 of FIGURE 2 showing principally the inner side of the planetary-gear carriage.

The list finder as shown in FIGURE 1 does not include a frame structure in order to simplify the showing and description. The list finder comprises a long tape 10 bearing the list of names or other items and carried in the manner of a scroll between two supply rollers 11 and 12. The tape is lead from the supply roll 11 across a writing platen 13 and around a sprocket roller 14 to the other supply roller 12. The shafts of these rollers, referred to by the numbers of the rollers with the suffix letter "a," are all maintained in a fixed driven relationship by a gear train 15 comprising gears 11b, 12b and 14b on the respective shafts of the rollers. The rollers 12 and 14 are rigidly connected to their respective shafts, but the supply roller 11 is connected to its shaft through a torsion spring 16 to maintain the tape under constant tension throughout the run of the tape from one supply roller to the other. The sprocket roller 14 has sprocket teeth 14a engaging sprocket holes 10a in the tape to provide a driving engagement of the roller with the tape. This sprocket roller is driven in either direction by a reversable motor 17 through a belt drive 18. Overlying the writing platen is a cover member 19, fractionally shown, which has a transverse opening 19a to expose to view a narrow strip of the tape. The tape itself has major cross-lines 20, 21, etc., marking subdivisions of the alphabet. Between these major division lines are intervening fine transverse lines 22 along which are written respective subscribers names and telephone numbers.

On a rightward extension of the shaft 11a of the supply roller 11 there is mounted a selecting mechanism 23 of the invention shown in detail in FIGURES 2 and 3. This selecting mechanism includes a stationary cup-shaped housing 24 carried by a mounting bracket 25. Both the bracket and housing have a central clearance opening 26 through which extends the shaft 11a. Mounted concentrically within the cup on the shaft 11a, as will appear, is a planetary-gear carriage in the form of a disk 27 having a peripheral rim 27a. On the disk carriage 27 about midway between its rim and the central axis is a through bearing 28 in which is journalled a shaft 29 for a set of planetary gears comprising a larger gear 30 between the disk and the inner wall of the housing 24 meshing with a pinion gear 31 secured to the shaft 11a, and a smaller gear 32 at the outer side of the disk which meshes with a larger gear 33 having a bushing 33a journalled on the shaft 11a. This bushing extends through a hub 34 of the disk carriage 27 to provide a central bearing for the latter. Secured to the outer end of the bushing 33a, as by staking, is a cup-shaped indexing control knob 35 which encompasses the housing 24 at a clearance distance therefrom. The index control knob has a knurled rim 36 at its outer end for easy grip of the hand in manipulating the control knob, and has an index scale 37 at its inner end extending approximately three-fourths therearound. This index scale is provided with a series of crosslines dividing letters and group of letters of the alphabet into subdivisions, the subdivisions being unequally spaced so as to provide greater indexing length for those letters which are more frequently the first letters of telephone subscribers surnames and less indexing length for letters which are less frequently so used. A stationary pointer 38 on the housing 24 overlies the index scale 37 to enable ready determination of the rotational positioning of the index control knob. A second manual control knob 39—the aforementioned socalled "vernier" control—is directly secured to the end of the shaft 11a beyond the indexing knob 35 to enable the list finder tape 10 to be shifted into precise positions directly by hand.

Concentric with the outer rim 27a of the planetary gear carriage 27 is an inner ring 40 forming an annular channel 41 between it and the outer rim. This channel is closed along the length thereof by an annular cam plate 42 held in place by three equidistantly spaced screws 43, 43a and 43b one of which is located adjacent the bearing 28 (FIGURE 3). This cam plate has a dwell 42a on a larger radius about the center of the disk carriage extending throughout about one-half the length of the cam plate running from the bearing 28, and has a second dwell 42b on a smaller radius about the center of the disk carriage extending throughout about the remaining one-half length. Directly diametrically opposite the bearing 28 these two dwells are joined on an incline by a cam 44. This cam controls a switch lever 45 pivoted on a stud 46 on the bracket 25, the cam operating on a roller 47 journaled on a stud 48 staked to the inner end of the switch lever and extending through a clearance opening 49 in the bracket 25 and housing 24. The switch lever is biased counterclockwise by a tension spring 45a connected between the inner end of the switch lever and the bracket 25 (FIGURE 1). By this biasing action the switch lever is held in constant engagement with the inner edge or cam surface of the cam plate 42.

The forward end of the switch lever 45 carries a cross pin 50 on which is journaled a roller 51 of insulating material. Bearing against this roller are spring-urged operating arms of two separate switches 52 and 53. The operating arms are so shaped that when the switch lever is in a neutral or intermediate position shown in FIGURE 1 both switches are held in their "off" positions, but when the switch lever is shifted in one direction from its intermediate position one switch is shifted to "on" position and when the switch lever is shifted in the other direction from intermediate position the other switch is shifted to "on" position. The motor 17 may be of the D.C. type which can be reversed by changing the polarity of the supply current and which has accordingly a neutral terminal N, forward drive terminal F and a reverse drive terminal R. The power source may be a battery B having one terminal connected to the neutral terminal N of the motor and having the other terminal connected to one terminal of each of the switches 52 and 53. The other terminal of one of the switches is connected to the forward terminal F of the motor and the other terminal of the other of the switches is then connected to the reverse terminal R of the motor, all as is shown in FIGURE 1.

When the disk carriage 27 is in a neutral position wherein the switch lever 45 engages a midposition of the cam 44 both switches 52 and 53 are held open and the motor 17 is at standstill. Upon turning the index knob 35 counterclockwise as it would appear from the right end of the shaft 11a the disk carriage 27 is likewise turned counterclockwise out of neutral position, the forward end of switch lever 45 is shifted downwardly to close switch 52 and start the motor driving the tape in a reverse direction past the window towards the "A" end of the alphabet. During this motor driving of the tape the disk carriage is returned gradually to neutral position to return switch 52 to "off" position and stop the motor when the positioning of the tape relative to the window corresponds to the positioning of the index knob 35. Vice versa, upon turning the index knob 35 towards the "Z" end of the scale the disk carriage 27 is turned likewise out of neutral position to close switch 53 and start the motor driving the tape 10 in a forward direction past the window towards the "Z" end of the alphabet with the disk carriage being again returned gradually to neutral position to stop the motor when the tape reaches the position corresponding to the setting of the index control knob.

As shown in the drawings there is a stepped-up gear ratio—i.e., ratio of delivered to applied force—between the pinion gear 31 on the shaft 11a and the planetary gear 30 and there is a stepped-down gear ratio between the gear 33 on the index control knob 35 and the planetary gear 32. By way of example, these ratos are such that upon turning the index control knob 35 while the shaft 11a is at standstill the planetary gear carriage 27 is advanced with the index control knob with a step-up movement ratio of 9 to 8, and upon turning the shaft 11a by the manual control knob 39 while the index control knob 35 is at standstill the planetary gear carriage 27 is turned at a rate of one revolution for each eight revolutions of the shaft 11a.

In assembling the selector mechanism the disk carriage 27 is first mounted on the shaft 11a and turned until the cam 44 engages the switch lever 45 and holds it in a midposition, and next the index control knob 35 is slid onto the shaft 11a with its bushing being inserted into the hub of the disk carriage while the knob is so oriented that the pointer 38 registers with the letter L division of the index scale 37. Afterwards the manual knob 39 is slid onto the outer end of the shaft 11a and secured thereto as by a set screw 39a. Stop pins S on the knob 35 serve by their abutment against a cylindrical container 55 on the housing 24, hereinafter described, to limit the rotational movement of the knob to the ends of the scale 37.

A correct operation of the present selector mechanism requires (1) that while the planetary gear carriage 27 is in neutral position and the motor drive is at standstill the manual turning of the list finder shaft 11a by the knob 39 will not turn the planetary gear carriage 27 out of neutral position via gears 31, 30, 32 and 33 and start the motor; and (2) that while the planetary gear carriage 27 is out of neutral position the driving of the list finder shaft 11a by the motor will not alter the setting of the index control knob 35. In other words, to prevent the first stated possible misoperation the disk carriage 27 must be strongly detented in neutral so that it is the index control knob 35 and not the disk carriage 27 which is turned responsive to manual turning of the shaft 11a by the knob 39; and to prevent the second possible misoperation the index control knob 35 must be more strongly frictionally held than is the disk carriage 27 while the carriage is out of neutral position so that it will be the carriage 27 and not the index control knob 35 which is turned responsive to a driven movement of the shaft 11a by the motor.

The above required conditions have been met very simply by providing the index control knob 35 with a fixed frictional drag and by providing the disk carriage 27 with a detent which exerts a strong detenting force on the disk carriage while the same is in neutral position but which leaves the disk carriage substantially friction-free when it is out of neutral position. The fixed frictional drag on the index control knob 35 is supplied by a cylindrical friction pad 54 mounted slidably through an opening in the peripheral wall of the housing 24 in a cylindrical container 55 secured to the inner side of this wall. In the container 55 back of the pad 54 there is a compression spring 56 which presses the pad outwardly against the inner wall of the knob 35. The special detenting means for the disk carriage 27 comprises a detent ball 57 mounted in the channel 41 through a clearance hole serving as a ball guide in the rim of the disk carriage 27, the detent ball 57 being positioned diametrically opposite the bearing 28 for the planetary gears 29 and 30. This detent ball is spring-urged radially outwardly through the clearance hole into engagement with a circular recess 59 in the rim of the housing 24 positioned diametrically opposite the pointer 38. Outward pressure is exerted on the detent ball 57 by compression springs 60 and 61 in the channel 41 acting against the detent ball through respective smaller diameter pressure balls 62 and 63, the compression springs being interposed between the pressure balls and two of the aforementioned retaining screws 43 designated in the drawing by respective suffix letters *a* and *b*. Since the compression springs 60 and 61 are obliquely disposed by the annular channel 41 they provide a radial outward thrust on the detent ball 57 which is amplified by a toggle action as the pressure balls 62 and 63 are moved more and more behind the detent ball in a wedging manner between it and the inner wall 40 of the channel 41. Thus, a very strong thrust is provided urging the detent ball 57 into engagement with the recess 59 to provide a very strong detenting force on the disk carriage when it is in its neutral position. However, as the disk carriage is forcibly moved out of neutral position the detent ball is cammed radially inwardly against the inside smooth wall of the housing, and being thus moved inwardly to almost a direct line between the pressure balls 62 and 63, except for the thickness of the rim of the disk carriage, the outward radial thrust on the detent ball is now reduced to an extremely small value in accordance with the small values of tangent functions of small angles. The detent ball 57 therefore provides practically no frictional drag on the disk carriage when the same is out of neutral position. Under these conditions the frictional drag on the index control knob 35 causes the knob to remain at whatever setting it is placed while the list finder is being motor driven. On the other hand, very strong detenting action provided the planetary gear carriage 27 when it is in neutral position overpowers the frictional drag on the index control knob 35 to cause the index control knob to be shifted gradually during manual rotation of the shaft 11a in accordance with the shifting of the list finder.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. In a list finding apparatus or the like including a viewer's station, an elongate medium movable past said station, and a reversible motor drive for said medium: the combination of a selector mechanism including a fixedly mounted control switch means operable selectively from "off" position to start said drive in either direction; a manual index control having a limited range of movement corresponding to a full range of travel of said medium; a scale associated with said index control calibrated to enable the control to be set to any new position corresponding to a desired position of said elongate medium relative to said viewer's station; and a follow-up mechanism initially shifted from a neutral position by said index control to an extent corresponding to a distance between a last prior setting and a new setting of the index control including means for directionally operating said switch means to start said drive in forward and reverse directions respectively in response to initial forward and reverse movements of said index control from any position in its range of movement, and means activated by said motor drive for returning said follow-up mechanism to neutral position in correspondence with the travel of said elongate medium whereby to return said switch means to "off" position when the elongate medium reaches the selected desired position.

2. In a list finding apparatus or the like including a viewer's station, an elongate medium movable past said station, and a reversible motor drive for said medium the combination of a selector mechanism including a fixedly mounted control switch means operable selectively from "off" position to start said drive in either direction; a manual index control having a limited range of movement corresponding to a full range of travel of said medium; a scale associated with said index control calibrated to enable the control to be set to any new position corresponding to a desired position of said elongate medium relative to said viewer's station; a drive shaft for said elongate medium; a planetary gear mechanism including a carrier journaled on said drive shaft and gears journaled to said carrier coupled at one end to said index control and at the other end to said shaft; means for operating said switch means in one direction to start forward drive of said medium as the planetary-gear carrier is advanced from a predetermined intermediate position and for operating said switch means in the other direction to start reverse drive of said medium as the planetary gear carriage is back-spaced from said intermediate position; and a control knob on said shaft for shifting said medium directly by hand.

3. The list finder apparatus set forth in claim 2 wherein the gear ratio between said shaft and planetary gear is stepped up and the gear ratio between said index control and said planetary gear is stepped down to require a multiplicity of turns of said shaft to effect an approximate single revolution of said index control while said planetary-gear carrier is held stationary and to require a single approximate revolution of said index control to produce a substantially equal rotation of said planetary-gear carrier when said shaft is held stationary.

4. The list finder apparatus set forth in claim 2 including a disk-shaped carrier for said planetary gears journaled on said shaft, said carrier having an annular cam member thereon provided with two dwell portions respectively at different radial distances from the journal axis of the carrier, said dwell portions being joined by an obliquely disposed cam portion, and means for directionally operating said switch means by said cam portion including a switch lever engaging an intermediate point of said cam portion when said carrier is in a predetermined intermediate position; and spring means urging said switch member against said cam member causing the switch lever to be shifted in one direction responsive to movement of said carrier in one direction from said predetermined position and in the other direction responsive to movement of said carrier in the other direction from said predetermined position.

5. The list finder apparatus set forth in claim 2 including means providing a constant friction drag on the said index control, and means for providing a detent on said planetary-gear carrier in said predetermined position having a detenting action overpowering said friction drag on said index control when said shaft is turned, and having a substantially less friction effect on said carrier than the drag on said index control when said carrier is out of said predetermined position.

6. In a selector mechanism for a list finder or similar apparatus having a reversible motor drive: the combination of a control switch means operable selectively from an "off" position to start said drive in either direction; a drive shaft for said list finder; a planetary gear mechanism including a disk-shaped carrier journaled on said shaft and a set of planetary gears journaled on said carrier; a gear secured to said shaft meshing with one of said planetary gears; an index control knob journaled on said shaft and carrying a gear meshing with the other of said planetary gears; means controlled by said carrier for holding said switch means in "off" position when the carrier is at a predetermined neutral position and for operating said switch means to start said motor drive in forward and reverse directions respectively as said carrier is advanced and backspaced from said neutral position; means for turning said drive shaft directly by hand; friction drag means on said index control member; and detent means applied to said planetary-gear carrier for supplying a strong detent force on the carrier when the carrier is in neutral position and for leaving the carrier substantially friction-free when the same is out of neutral position.

7. The selector mechanism set forth in claim 6 wherein said detent means comprises a stationary cup-shaped housing surrounding said disk-shaped carrier at a clearance distance therefrom, said housing having a recess in its inner wall confronting said carrier, said carrier having a peripheral rim provided with a circular opening and having a concentric inner wall providing an annular channel between it and said rim; an arcuate plate closing said channel; a detent ball in said channel extending loosely through the opening in said rim; pressure balls in said channel at opposite sides of said detent ball; and compression springs in said channel at opposite sides of said pressure balls for pressing the latter against opposite sides of the detent ball to exert an outward radial thrust on the detent ball which is increased as the detent ball is moved farther outwardly, said detent ball being positioned to engage said recess when said carrier is in said neutral position and said detent ball being cammed inwardly against the wall of said housing with reduction in the outward thrust exerted on the detent ball as said carrier is moved in either direction out of neutral position.

References Cited in the file of this patent

UNITED STATES PATENTS

| | | |
|---|---|---|
| 2,386,555 | Hughes | Oct. 9, 1945 |
| 2,398,226 | Holland | Apr. 9, 1946 |
| 2,482,615 | Fowler | Sept. 20, 1949 |
| 2,765,552 | Schlafly | Oct. 9, 1956 |
| 2,901,847 | Lee | Sept. 1, 1959 |